US012639723B2

(12) United States Patent
Carmody et al.

(10) Patent No.: US 12,639,723 B2
(45) Date of Patent: May 26, 2026

(54) ARTIFICIAL-INTELLIGENCE-BASED ORCHESTRATION

(71) Applicant: 6SENSE INSIGHTS, INC., San Francisco, CA (US)

(72) Inventors: Daniel Carmody, Durham, NC (US); Tanvi Shah, Cupertino, CA (US); Amar Doshi, Sunnyvale, CA (US); Alex Lin, San Francisco, CA (US); Steven Sassman, San Francisco, CA (US); Yulia Tyutina, Eden Prairie, MN (US); Viral Bajaria, Redwood City, CA (US); Aditya Majumdar, Philadelphia, PA (US)

(73) Assignee: 6SENSE INSIGHTS, INC., San Francisco, CA (US)

( * ) Notice: Subject to any disclaimer, the term of this patent is extended or adjusted under 35 U.S.C. 154(b) by 313 days.

(21) Appl. No.: 17/736,366

(22) Filed: May 4, 2022

(65) Prior Publication Data

US 2022/0358522 A1    Nov. 10, 2022

Related U.S. Application Data

(60) Provisional application No. 63/185,271, filed on May 6, 2021.

(51) Int. Cl.
*G06Q 30/0201* (2023.01)
*G06N 5/022* (2023.01)
*G06N 5/04* (2023.01)

(52) U.S. Cl.
CPC ......... *G06Q 30/0201* (2013.01); *G06N 5/022* (2013.01); *G06N 5/04* (2013.01)

(58) Field of Classification Search
CPC ...... G06Q 30/0201; G06N 5/022; G06N 5/04; G06N 20/00
See application file for complete search history.

(56) References Cited

U.S. PATENT DOCUMENTS 11,544,627 B1 *   1/2023   Bryce .................... G06Q 40/06
2013/0326375 A1   12/2013   Barak et al.
(Continued)

OTHER PUBLICATIONS

International Search Report in corresponding PCT/US22/27702, ISA/US, Sep. 2, 2022.
(Continued)

*Primary Examiner* — Dylan C White
(74) *Attorney, Agent, or Firm* — Procopio, Cory, Hargreaves & Savitch LLP

(57) ABSTRACT

AI-based orchestration. In an embodiment, a recommendation engine is applied to a data pipeline representing company accounts. Engagement metric(s) are calculated based on activity data associated with the company accounts, and predictive model(s) are applied to the activity data and/or firmographic data associated with the company accounts to generate predictive output. A tactic recommendation model is applied to orchestration features, comprising the engagement metric(s) and predictive output, to generate recommended tactic(s). In addition, a contact recommendation model is applied to contact data to generate recommended contact(s). The recommended tactic(s) are combined with the recommend contact(s) to generate an orchestration, comprising recommended action(s), to be executed.

18 Claims, 4 Drawing Sheets

(56)                     References Cited

U.S. PATENT DOCUMENTS

| 2018/0365767 | A1  | 12/2018 | Mond et al. |              |
|--------------|-----|---------|-------------|--------------|
| 2019/0026786 | A1* | 1/2019  | Khoury      | G06Q 30/0271 |
| 2020/0372016 | A1  | 11/2020 | Rogynskyy et al. |         |
| 2023/0186226 | A1* | 6/2023  | Ceniti      | G06Q 10/0838 |
|              |     |         |             | 705/330      |
| 2023/0316371 | A1* | 10/2023 | Carrow      | G06Q 30/0631 |
|              |     |         |             | 705/26.7     |
| 2023/0319165 | A1* | 10/2023 | Govan       | G06Q 10/107  |
|              |     |         |             | 709/217      |

OTHER PUBLICATIONS

Extended European Search Report dated Dec. 23, 2025 in European
Patent Application No. 22799523.0.

* cited by examiner

ARTIFICIAL-INTELLIGENCE-BASED ORCHESTRATION

CROSS-REFERENCE TO RELATED APPLICATIONS

This application claims priority to U.S. Provisional Patent App. No. 63/185,271, filed on May 6, 2021, which is hereby incorporated herein by reference as if set forth in full.

BACKGROUND

Field of the Invention

The embodiments described herein are generally directed to artificial intelligence (AI), and, more particularly, to AI-based orchestration of marketing, sales, and customer lifecycle strategies to help companies grow their businesses and customer relationships.

Description of the Related Art

Despite the proliferation of computer-based automation, conventional marketing, sales, and post-sale customer lifecycle strategies are still designed and executed manually. This is due to the significant amount of human judgment and creativity that is required to orchestrate marketing strategies, determine timing for marketing and sales outreach, and understand the best methods to engage existing customers for their expanded needs over time. What is needed are solutions for overcoming these obstacles to automation, so that many marketing, sales, and customer lifecycle strategies can be automatically orchestrated with little or no human involvement to enable scale, as well as fast, proactive action to achieve better outcomes.

SUMMARY

Accordingly, systems, methods, and non-transitory computer-readable media are disclosed for AI-based orchestration that overcomes one or more obstacles to automation. For example, certain embodiments may utilize machine learning to imbue a computer with artificial intelligence that is capable of replacing the human judgment and creativity currently required for orchestration of various marketing, sales, and customer lifecycle strategies.

In an embodiment, a method comprises using at least one hardware processor to: receive one or more orchestration settings; apply a recommendation engine to a data pipeline representing a plurality of company accounts by receiving activity data associated with the plurality of company accounts, receiving firmographic data associated with the plurality of company accounts, calculating one or more engagement metrics based on the activity data, wherein the one or more engagement metrics indicate a level of engagement by each of the plurality of company accounts, applying one or more predictive models to one or both of the activity data and the firmographic data to generate a predictive output, applying a tactic recommendation model to orchestration features, comprising the engagement metrics and the predictive output, to generate one or more recommended tactics, applying a contact recommendation model to contact data to generate one or more recommended contacts, and combining the one or more recommended tactics with the one or more recommended contacts to generate an orchestration comprising one or more recommended actions; and execute the orchestration.

The one or more orchestration settings may comprise an orchestration goal. The orchestration goal may define one or more entry criteria, wherein the method further comprises using the at least one hardware processor to select the plurality of company accounts as a subset of a plurality of available company accounts based on the one or more entry criteria. The orchestration goal may define one or more exit criteria, wherein the method further comprises using the at least one hardware processor to, after executing the orchestration, measure a success of the orchestration based on company accounts that satisfy the one or more exit criteria.

The one or more orchestration settings may comprise a set of tactics, wherein the tactic recommendation model is constrained to only incorporate tactics from the set of tactics into the one or more recommended tactics.

The one or more orchestration settings may comprise, for at least one tactic that is available to be recommended by the tactic recommendation model, an identifier of at least one marketing campaign to be associated with the at least one tactic.

The one or more orchestration settings may comprise an indication of whether or not the orchestration is to be executed automatically, wherein the method comprises using the at least one hardware processor to: when the indication is that the orchestration is to be executed automatically, automatically execute the orchestration without user intervention; and, when the indication is that the orchestration is not to be executed automatically, request user approval of the orchestration, and execute the orchestration only after the user approval has been received.

The activity data may comprise representations of online activities that have been mapped to the plurality of company accounts, wherein calculating the one or more engagement metrics comprises weighting a first type of online activity higher than a second type of online activity.

The one or more predictive models may comprise a profile model that predicts a fit between each of the plurality of company accounts and a sales opportunity based on the firmographic data, wherein the orchestration features comprise the predicted fits for the plurality of company accounts.

The one or more predictive models may comprise an intent model that predicts a stage within a buying process for each of the plurality of company accounts based on the activity data, wherein the orchestration features comprise the predicted stages for the plurality of company accounts.

The orchestration features may further comprise at least a subset of the firmographic data.

The one or more recommended tactics may comprise adding a customer account to a marketing campaign. Combining the one or more recommended tactics with the one or more recommended contacts may comprise converting a tactic to add a customer account to a marketing campaign into an action to add one of the recommended contacts, which is already associated with one of the plurality of customer accounts, to a marketing campaign identified in the orchestration settings.

The one or more recommended tactics may comprise purchasing a new contact to be added to the orchestration. Combining the one or more recommended tactics with the one or more recommended contacts may comprise converting a tactic to acquire (e.g., purchase) a new contact into an action to acquire (e.g., purchase) one of the recommended contacts, which is not already associated with one of the plurality of company accounts.

The tactic recommendation model may comprise a plurality of modular tactic-specific models, wherein each of the plurality of modular tactic-specific models is trained to determine whether or not a respective tactic should be used for each of the plurality of company accounts based on the orchestration features associated with that company account.

The contact recommendation model may utilize one or more predictive models to predict a relevance of each contact, which is associated with the plurality of company accounts, to a sales opportunity, and generate the one or more recommended contacts based on the predicted relevance. The contact recommendation model may further utilize the one or more predictive models to predict a relevance of each of a plurality of contacts, which is not already associated with the plurality of company accounts, to a sales opportunity.

Any of the methods above may be embodied, individually or in any combination, in executable software modules of a processor-based system, such as a server, and/or in executable instructions stored in a non-transitory computer-readable medium.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

In an embodiment, systems, methods, and non-transitory computer-readable media are disclosed for AI-based orchestration. After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

1. System Overview

1.1. Infrastructure

Figure 1:
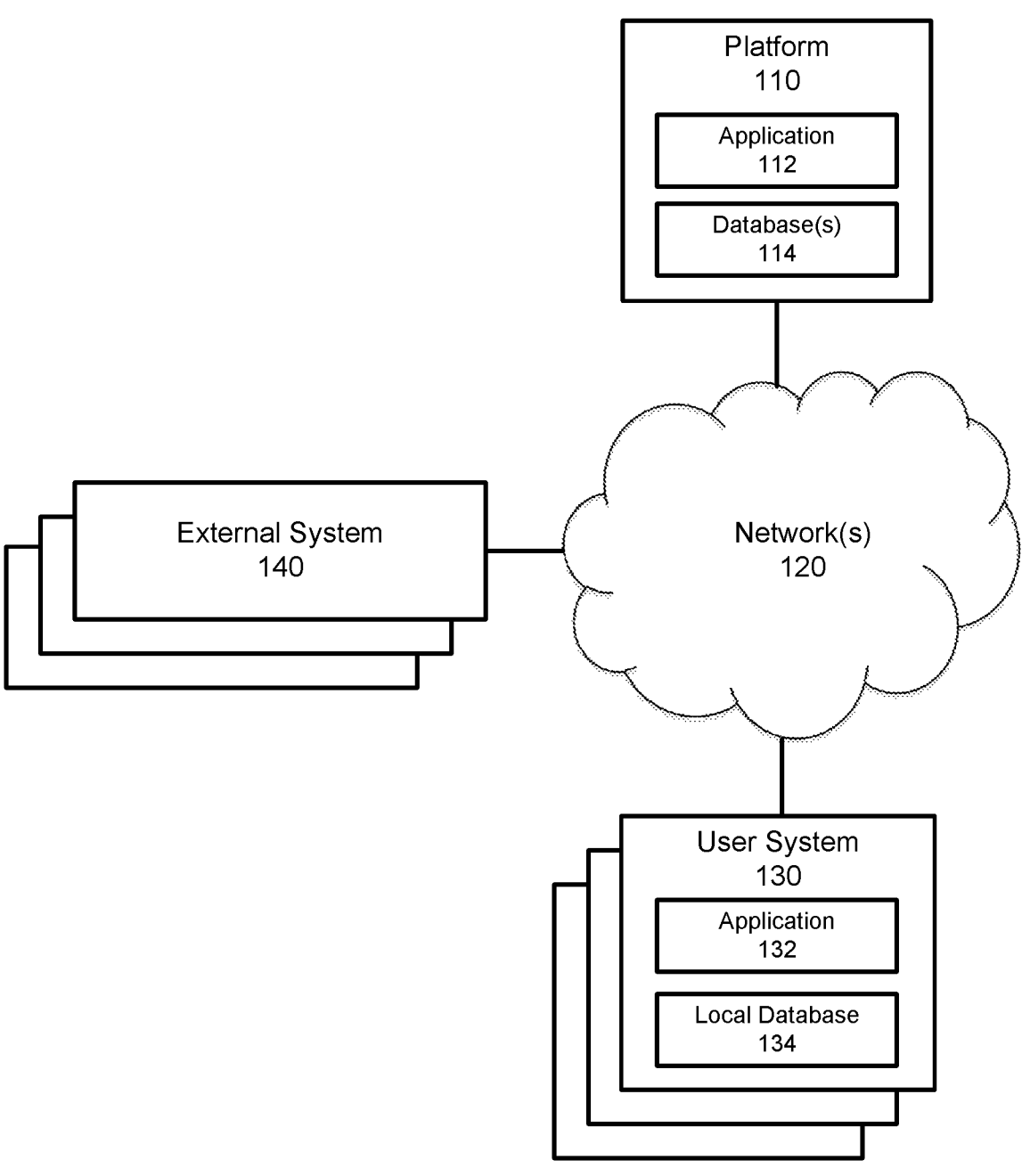
FIG. 1 illustrates an example infrastructure, in which one or more of the processes described herein, may be implemented, according to an embodiment.

FIG. 1 illustrates an example infrastructure in which one or more of the disclosed processes may be implemented, according to an embodiment. The infrastructure may comprise a platform 110 (e.g., one or more servers) which hosts and/or executes one or more of the various functions, processes, methods, and/or software modules described herein. Platform 110 may comprise dedicated servers, or may instead comprise cloud instances, which utilize shared resources of one or more servers. These servers or cloud instances may be collocated and/or geographically distributed. Platform 110 may also comprise or be communicatively connected to a server application 112 and/or one or more databases 114. In addition, platform 110 may be communicatively connected to one or more user systems 130 via one or more networks 120. Platform 110 may also be communicatively connected to one or more external systems 140 (e.g., other platforms, websites, etc.) via one or more networks 120.

Network(s) 120 may comprise the Internet, and platform 110 may communicate with user system(s) 130 through the Internet using standard transmission protocols, such as HyperText Transfer Protocol (HTTP), HTTP Secure (HTTPS), File Transfer Protocol (FTP), FTP Secure (FTPS), Secure Shell FTP (SFTP), and the like, as well as proprietary protocols. While platform 110 is illustrated as being connected to various systems through a single set of network(s) 120, it should be understood that platform 110 may be connected to the various systems via different sets of one or more networks. For example, platform 110 may be connected to a subset of user systems 130 and/or external systems 140 via the Internet, but may be connected to one or more other user systems 130 and/or external systems 140 via an intranet. Furthermore, while only a few user systems 130 and external systems 140, one server application 112, and one set of database(s) 114 are illustrated, it should be understood that the infrastructure may comprise any number of user systems, external systems, server applications, and databases.

User system(s) 130 may comprise any type or types of computing devices capable of wired and/or wireless communication, including without limitation, desktop computers, laptop computers, tablet computers, smart phones or other mobile phones, servers, game consoles, televisions, set-top boxes, electronic kiosks, point-of-sale terminals, and/or the like. However, it is contemplated that user system(s) 130 would generally comprise personal computers and/or workstations operated by users with user accounts on platform 110. These users may be agents (e.g., employees, such as members of sales or marketing teams) of entities that sell products, which may include goods or services. Each user system 130 may comprise or be communicatively connected to a client application 132 and/or one or more local databases 134.

Platform 110 may comprise web servers which host one or more websites and/or web services. In embodiments in which a website is provided, the website may comprise a graphical user interface, including, for example, one or more screens (e.g., webpages) generated in HyperText Markup Language (HTML) or other language. Platform 110 transmits or serves one or more screens of the graphical user interface in response to requests from user system(s) 130. In some embodiments, these screens may be served in the form of a wizard, in which case two or more screens may be served in a sequential manner, and one or more of the sequential screens may depend on an interaction of the user or user system 130 with one or more preceding screens. The requests to platform 110 and the responses from platform 110, including the screens of the graphical user interface, may both be communicated through network(s) 120, which may include the Internet, using standard communication protocols (e.g., HTTP, HTTPS, etc.). These screens (e.g., webpages) may comprise a combination of content and elements, such as text, images, videos, animations, references (e.g., hyperlinks), frames, inputs (e.g., textboxes, text areas, checkboxes, radio buttons, drop-down menus, buttons, forms, etc.), scripts (e.g., JavaScript), and the like, including elements comprising or derived from data stored in one or more databases (e.g., database(s) 114) that are locally and/or remotely accessible to platform 110. Platform 110 may also respond to other requests from user system(s)

130. In an embodiment, when a user logs into a user account on platform 110, server application 112 may generate a dashboard, within the graphical user interface, that the user can utilize to view the most relevant or important information and/or navigate to other screens of the graphical user interface.

Platform 110 may comprise, be communicatively coupled with, or otherwise have access to one or more database(s) 114. For example, platform 110 may comprise one or more database servers which manage one or more databases 114. Server application 112 executing on platform 110 and/or client application 132 executing on user system 130 may submit data (e.g., user data, form data, etc.) to be stored in database(s) 114, and/or request access to data stored in database(s) 114. Any suitable database may be utilized, including without limitation My SQL™, Oracle™, IBM™, Microsoft SQL™, Access™, PostgreSQL™, and the like, including cloud-based databases and proprietary databases. Data may be sent to platform 110, for instance, using the well-known POST request supported by HTTP, via FTP, and/or the like. This data, as well as other requests, may be handled, for example, by server-side web technology, such as a servlet or other software module (e.g., comprised in server application 112), executed by platform 110.

In embodiments in which a web service is provided, platform 110 may receive requests from external system(s) 140, and provide responses in eXtensible Markup Language (XML), JavaScript Object Notation (JSON), and/or any other suitable or desired format. In such embodiments, platform 110 may provide an application programming interface (API) which defines the manner in which user system(s) 130 and/or external system(s) 140 may interact with the web service. Thus, user system(s) 130 and/or external system(s) 140 (which may themselves be servers), can define their own user interfaces, and rely on the web service to implement or otherwise provide the backend processes, methods, functionality, storage, and/or the like, described herein. For example, in such an embodiment, a client application 132, executing on one or more user system(s) 130, may interact with a server application 112 executing on platform 110 to execute one or more or a portion of one or more of the various functions, processes, methods, and/or software modules described herein. In an embodiment, client application 132 may utilize local database 134 for storing data locally on user system 130.

Client application 132 may be "thin," in which case processing is primarily carried out server-side by server application 112 on platform 110. A basic example of a thin client application 132 is a browser application, which simply requests, receives, and renders webpages at user system(s) 130, while server application 112 on platform 110 is responsible for generating the webpages and managing database functions. Alternatively, the client application may be "thick," in which case processing is primarily carried out client-side by user system(s) 130. It should be understood that client application 132 may perform an amount of processing, relative to server application 112 on platform 110, at any point along this spectrum between "thin" and "thick," depending on the design goals of the particular implementation. In any case, the software described herein, which may wholly reside on either platform 110 (e.g., in which case server application 112 performs all processing) or user system(s) 130 (e.g., in which case client application 132 performs all processing) or be distributed between platform 110 and user system(s) 130 (e.g., in which case server application 112 and client application 132 both perform processing), can comprise one or more executable software modules comprising instructions that implement one or more of the processes, methods, or functions described herein.

1.2. Example Processing Device

Figure 2:
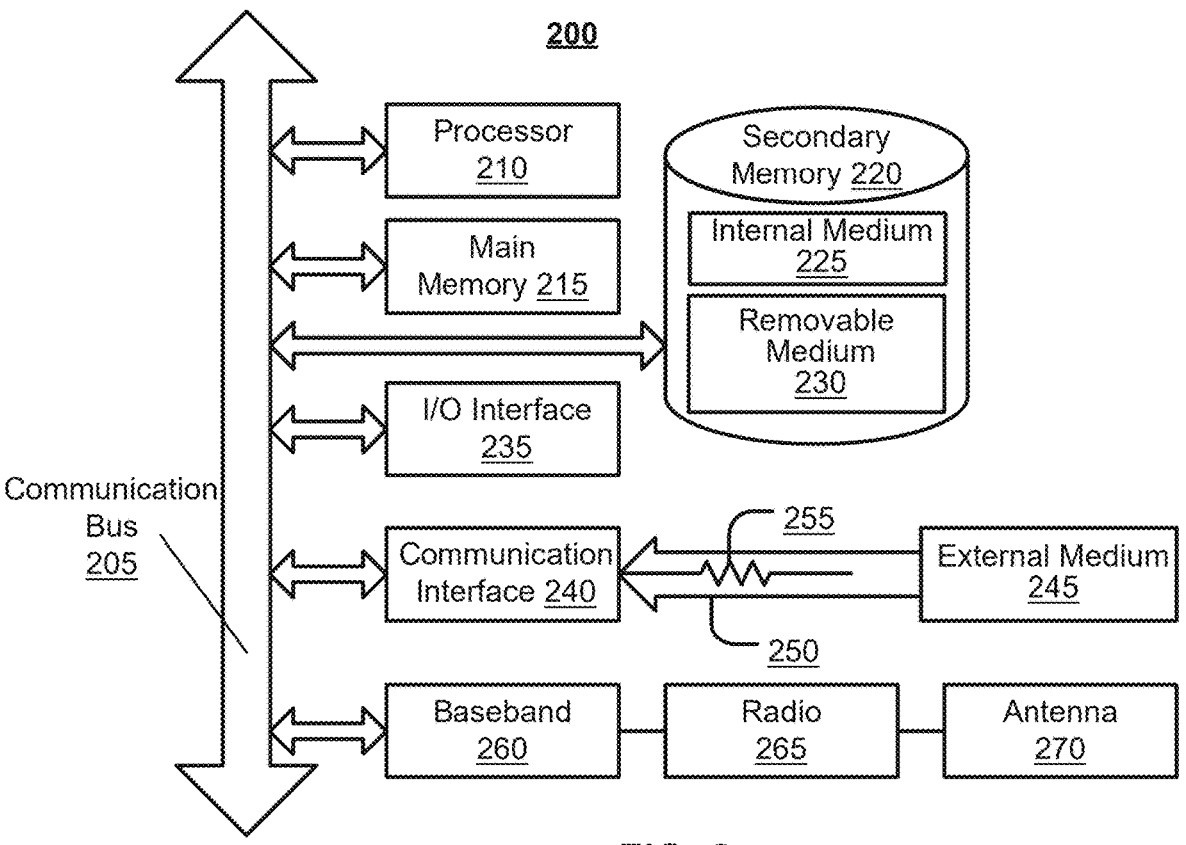
FIG. 2 illustrates an example processing system, by which one or more of the processes described herein, may be executed, according to an embodiment.

FIG. 2 is a block diagram illustrating an example wired or wireless system 200 that may be used in connection with various embodiments described herein. For example, system 200 may be used as or in conjunction with one or more of the functions, processes, or methods (e.g., to store and/or execute the software) described herein, and may represent components of platform 110, user system(s) 130, external system(s) 140, and/or other processing devices described herein. System 200 can be a server or any conventional personal computer, or any other processor-enabled device that is capable of wired or wireless data communication. Other computer systems and/or architectures may be also used, as will be clear to those skilled in the art.

System 200 preferably includes one or more processors 210. Processor(s) 210 may comprise a central processing unit (CPU). Additional processors may be provided, such as a graphics processing unit (GPU), an auxiliary processor to manage input/output, an auxiliary processor to perform floating-point mathematical operations, a special-purpose microprocessor having an architecture suitable for fast execution of signal-processing algorithms (e.g., digital-signal processor), a slave processor subordinate to the main processing system (e.g., back-end processor), an additional microprocessor or controller for dual or multiple processor systems, and/or a coprocessor. Such auxiliary processors may be discrete processors or may be integrated with processor 210. Examples of processors which may be used with system 200 include, without limitation, any of the processors (e.g., Pentium™, Core i7™, Xeon™, etc.) available from Intel Corporation of Santa Clara, California, any of the processors available from Advanced Micro Devices, Incorporated (AMD) of Santa Clara, California, any of the processors (e.g., A series, M series, etc.) available from Apple Inc. of Cupertino, any of the processors (e.g., Exynos™) available from Samsung Electronics Co., Ltd., of Seoul, South Korea, any of the processors available from NXP Semiconductors N.V. of Eindhoven, Netherlands, and/or the like.

Processor 210 is preferably connected to a communication bus 205. Communication bus 205 may include a data channel for facilitating information transfer between storage and other peripheral components of system 200. Furthermore, communication bus 205 may provide a set of signals used for communication with processor 210, including a data bus, address bus, and/or control bus (not shown). Communication bus 205 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPM), IEEE 696/S-100, and/or the like.

System 200 preferably includes a main memory 215 and may also include a secondary memory 220. Main memory 215 provides storage of instructions and data for programs executing on processor 210, such as any of the software discussed herein. It should be understood that programs stored in the memory and executed by processor 210 may be written and/or compiled according to any suitable language, including without limitation C/C++, Java, JavaScript, Perl, Visual Basic, .NET, and the like. Main memory 215 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 220 is a non-transitory computer-readable medium having computer-executable code (e.g., any of the software disclosed herein) and/or other data stored thereon. The computer software or data stored on secondary memory 220 is read into main memory 215 for execution by processor 210. Secondary memory 220 may include, for example, semiconductor-based memory, such as programmable read-only memory (PROM), erasable programmable read-only memory (EPROM), electrically erasable read-only memory (EEPROM), and flash memory (block-oriented memory similar to EEPROM).

Secondary memory 220 may optionally include an internal medium 225 and/or a removable medium 230. Removable medium 230 is read from and/or written to in any well-known manner. Removable storage medium 230 may be, for example, a magnetic tape drive, a compact disc (CD) drive, a digital versatile disc (DVD) drive, other optical drive, a flash memory drive, and/or the like.

In alternative embodiments, secondary memory 220 may include other similar means for allowing computer programs or other data or instructions to be loaded into system 200. Such means may include, for example, a communication interface 240, which allows software and data to be transferred from external storage medium 245 to system 200. Examples of external storage medium 245 include an external hard disk drive, an external optical drive, an external magneto-optical drive, and/or the like.

As mentioned above, system 200 may include a communication interface 240. Communication interface 240 allows software and data to be transferred between system 200 and external devices (e.g. printers), networks, or other information sources. For example, computer software or executable code may be transferred to system 200 from a network server (e.g., platform 110) via communication interface 240. Examples of communication interface 240 include a built-in network adapter, network interface card (NIC), Personal Computer Memory Card International Association (PCM-CIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 200 with a network (e.g., network(s) 120) or another computing device. Communication interface 240 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 240 are generally in the form of electrical communication signals 255. These signals 255 may be provided to communication interface 240 via a communication channel 250. In an embodiment, communication channel 250 may be a wired or wireless network (e.g., network(s) 120), or any variety of other communication links. Communication channel 250 carries signals 255 and can be implemented using a variety of wired or wireless communication means including wire or cable, fiber optics, conventional phone line, cellular phone link, wireless data communication link, radio frequency ("RF") link, or infrared link, just to name a few.

Computer-executable code (e.g., computer programs, such as the disclosed software) is stored in main memory 215 and/or secondary memory 220. Computer-executable code can also be received via communication interface 240 and stored in main memory 215 and/or secondary memory 220. Such computer programs, when executed, enable system 200 to perform the various functions of the disclosed embodiments as described elsewhere herein.

In this description, the term "computer-readable medium" is used to refer to any non-transitory computer-readable storage media used to provide computer-executable code and/or other data to or within system 200. Examples of such media include main memory 215, secondary memory 220 (including internal memory 225, removable medium 230, and external storage medium 245), and any peripheral device communicatively coupled with communication interface 240 (including a network information server or other network device). These non-transitory computer-readable media are means for providing software and/or other data to system 200.

In an embodiment that is implemented using software, the software may be stored on a computer-readable medium and loaded into system 200 by way of removable medium 230, I/O interface 235, or communication interface 240. In such an embodiment, the software is loaded into system 200 in the form of electrical communication signals 255. The software, when executed by processor 210, preferably causes processor 210 to perform one or more of the processes and functions described elsewhere herein.

In an embodiment, I/O interface 235 provides an interface between one or more components of system 200 and one or more input and/or output devices. Example input devices include, without limitation, sensors, keyboards, touch screens or other touch-sensitive devices, cameras, biometric sensing devices, computer mice, trackballs, pen-based pointing devices, and/or the like. Examples of output devices include, without limitation, other processing devices, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch panel display (e.g., in a smartphone, tablet, or other mobile device).

System 200 may also include optional wireless communication components that facilitate wireless communication over a voice network and/or a data network (e.g., in the case of user system 130 that comprises a mobile device, such as a smartphone or tablet computer). The wireless communication components comprise an antenna system 270, a radio system 265, and a baseband system 260. In system 200, radio frequency (RF) signals are transmitted and received over the air by antenna system 270 under the management of radio system 265.

In an embodiment, antenna system 270 may comprise one or more antennae and one or more multiplexors (not shown) that perform a switching function to provide antenna system 270 with transmit and receive signal paths. In the receive path, received RF signals can be coupled from a multiplexor to a low noise amplifier (not shown) that amplifies the received RF signal and sends the amplified signal to radio system 265.

In an alternative embodiment, radio system 265 may comprise one or more radios that are configured to communicate over various frequencies. In an embodiment, radio system 265 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 265 to baseband system 260.

If the received signal contains audio information, then baseband system 260 decodes the signal and converts it to an analog signal. Then the signal is amplified and sent to a speaker. Baseband system 260 also receives analog audio signals from a microphone. These analog audio signals are converted to digital signals and encoded by baseband system 260. Baseband system 260 also encodes the digital signals for transmission and generates a baseband transmit audio signal that is routed to the modulator portion of radio system 265. The modulator mixes the baseband transmit audio signal with an RF carrier signal, generating an RF transmit signal that is routed to antenna system 270 and may pass through a power amplifier (not shown). The power amplifier amplifies the RF transmit signal and routes it to antenna system 270, where the signal is switched to the antenna port for transmission.

Baseband system 260 is also communicatively coupled with processor(s) 210. Processor(s) 210 may have access to data storage areas 215 and 220. Processor(s) 210 are preferably configured to execute instructions (i.e., computer programs, such as the disclosed software) that can be stored in main memory 215 or secondary memory 220. Computer programs can also be received from baseband processor 260 and stored in main memory 210 or in secondary memory 220, or executed upon receipt. Such computer programs, when executed, can enable system 200 to perform the various functions of the disclosed embodiments.

2. Process Overview

Embodiments of processes for AI-based orchestration will now be described in detail. It should be understood that the described processes may be embodied in one or more software modules that are executed by one or more hardware processors (e.g., processor 210), for example, as a software application (e.g., server application 112, client application 132, and/or a distributed application comprising both server application 112 and client application 132), which may be executed wholly by processor(s) of platform 110, wholly by processor(s) of user system(s) 130, or may be distributed across platform 110 and user system(s) 130, such that some portions or modules of the software application are executed by platform 110 and other portions or modules of the software application are executed by user system(s) 130. The described processes may be implemented as instructions represented in source code, object code, and/or machine code. These instructions may be executed directly by hardware processor(s) 210, or alternatively, may be executed by a virtual machine operating between the object code and hardware processor(s) 210. In addition, the disclosed software may be built upon or interfaced with one or more existing systems.

Alternatively, the described processes may be implemented as a hardware component (e.g., general-purpose processor, integrated circuit (IC), application-specific integrated circuit (ASIC), digital signal processor (DSP), field-programmable gate array (FPGA) or other programmable logic device, discrete gate or transistor logic, etc.), combination of hardware components, or combination of hardware and software components. To clearly illustrate the interchangeability of hardware and software, various illustrative components, blocks, modules, circuits, and steps are described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a component, block, module, circuit, or step is for ease of description. Specific functions or steps can be moved from one component, block, module, circuit, or step to another without departing from the invention.

Furthermore, while the processes, described herein, are illustrated with a certain arrangement and ordering of subprocesses or components, each process may be implemented with fewer, more, or different subprocesses or components and a different arrangement and/or ordering of subprocesses or components. In addition, it should be understood that any subprocess, which does not depend on the completion of another subprocess, may be executed before, after, or in parallel with that other independent subprocess, even if the subprocesses are described or illustrated in a particular order.

2.1. Overview of AI-Based Orchestration

Two types of "accounts" will be discussed herein. To avoid confusion, one type of account will be referred to herein as a "user account," whereas the second type of account will be referred to herein as a "company account." A user account refers to an account that the user of platform 110 may have with platform 110. In particular, the user may register with platform 110 by providing certain information that is used to establish the user account, and may subsequently log in to the user account on platform 110 using credentials (e.g., username and password) provided during the registration process. It is contemplated that each user will generally represent an entity, such as a company or other organization, that sells a product (e.g., good or service). Each user account may be associated with and manage a plurality of company accounts that each represents a past, current, and/or prospective customer (i.e., a lead) of the entity represented by the user. A customer may be a company, a branch or division of a company, a sole proprietorship, or other legally formed organization, an individual, or any other consumer or potential consumer of a product. For the sake of simplifying the description, any past, current, and/or prospective customer will be referred to herein as a "company," even if such customer is not technically a commercial business.

To be clear, a user account, as discussed herein, is different than the company accounts, which may be associated with and managed by that user account. The company accounts that are managed by a user account may be received from an external system 140 managed by the entity represented by the user of the user account. For example, such an external system 140 may be a customer relationship management (CRM) system (e.g., one or more products offered by Salesforce of San Francisco, California) that is associated with the user account, a marketing automation platform (MAP, e.g., one or more products offered by Marketo, Inc. of San Mateo, California) that is associated with the user account, and/or the like. The data, representing the company accounts, may be "pushed" by external system 140 to platform 110 via an API of platform 110, or alternatively, may be "pulled" by platform 110 from external system 140 via an API of external system 140.

As used herein, "orchestration" refers to a strategic approach to the execution of marketing campaigns, sales tactics, and/or customer lifecycle engagement activity across one or a plurality of channels. In general, a marketing campaign, sales tactic, or customer lifecycle engagement activity refers to an attempt by the entity, represented by a user account, to engage with company accounts, with the ultimate purpose of selling products (e.g., goods or services). At a high level, contact-level and company-level profile and/or behavioral data may be aggregated from a plurality of different data sources. This data may then be utilized to orchestrate coordinated cross-channel campaigns, tactics, and/or customer lifecycle engagement activities that are tailored to each company account's firmographic profile and/or current stage in a buying process. Orchestration represents a holistic approach to delivering such coordination (e.g., multiple marketing campaigns, sales tactics, and/or customer lifecycle engagement activities across multiple channels), as opposed to a narrow approach that focuses on the execution of single, stand-alone campaigns, tactics, or engagement activities.

AI-based orchestration refers to the implementation of orchestrations through automated machine-learning recommendations and/or decisions meant to achieve orchestration effectiveness across channels, timing, and/or targeted audiences. The AI-based orchestration may be driven by a data pipeline that supplies aggregated and processed data to purpose-built machine-learning models. Once an AI-based orchestration has been configured and enabled, automated recommendations may be created and/or enacted through the use of machine learning and/or other data-driven decision-making tools.

2.2. Orchestration Configuration

Figure 3:
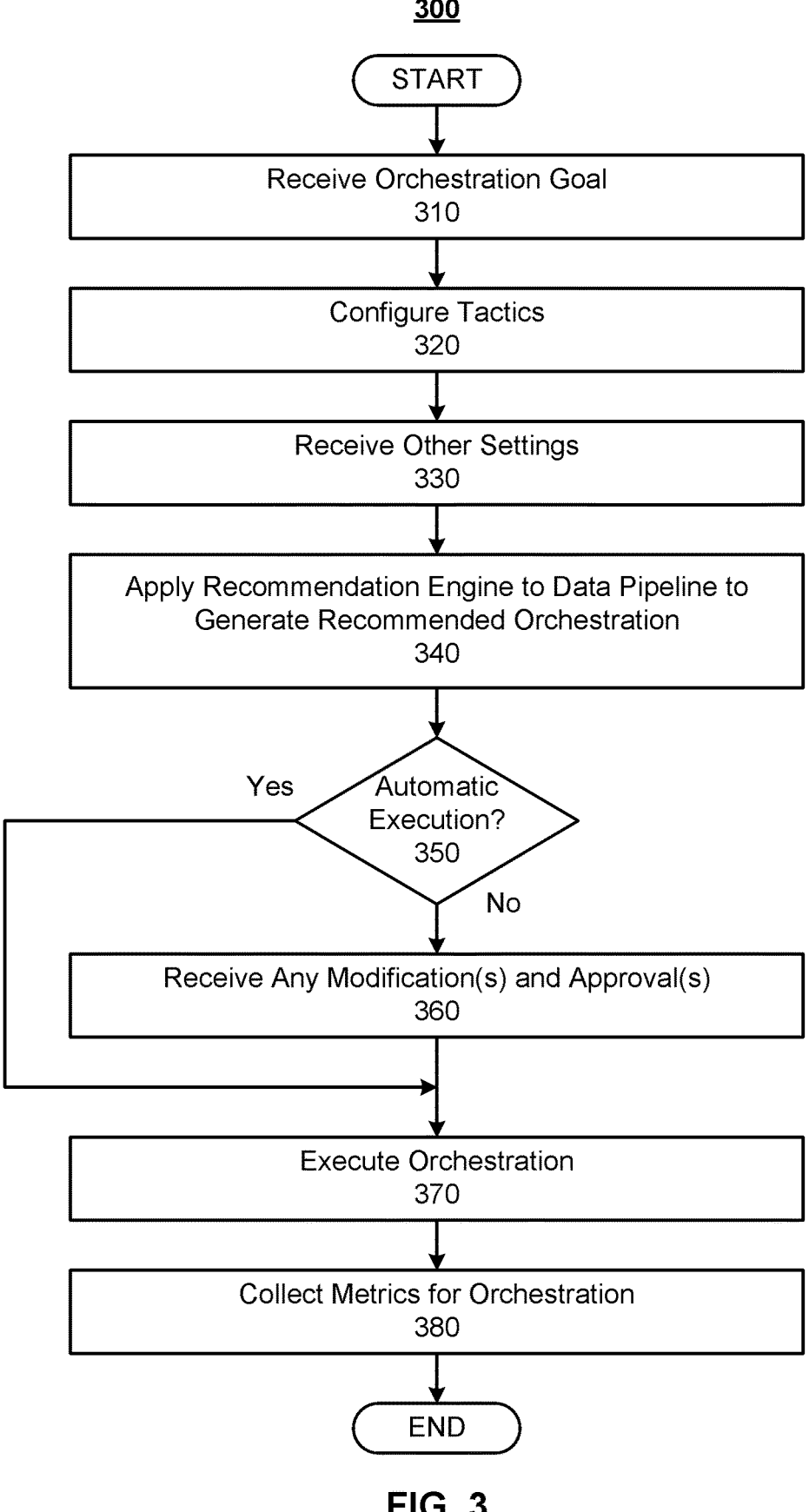
FIG. 3 illustrates an example process for configuring AI-based orchestration, according to an embodiment.

FIG. 3 illustrates an example process 300 for configuring AI-based orchestration, according to an embodiment. Process 300 may be implemented by server application 112 on platform 110, in conjunction with a graphical user interface provided by server application 112 and/or client application 132. The graphical user interface may comprise one or more screens with one or more inputs for receiving any of the information, including data and/or approvals, described with respect to process 300. The graphical user interface may be accessed by a user of a user account, representing an entity that offers a product for sale (e.g., good and/or service, online and/or offline), to configure and implement an orchestrated strategy with the aid of artificial intelligence.

In subprocess 310, an orchestration goal is received. For example, the user may select (e.g., from a plurality of available orchestration goals) or otherwise specify an orchestration goal through the graphical user interface. An orchestration goal is the high-level strategic goal that the user wishes to achieve with the orchestration. The orchestration goal may define one or more criteria by which the success of the orchestration is to be measured. In other words, the orchestration goal determines the metrics by which success of the orchestration, once executed, will be measured.

Additionally or alternatively, the orchestration goal may define one or more criteria by which company accounts are considered eligible to be acted upon by the orchestration being configured. In other words, a segment of company accounts to be acted upon by the orchestration may be selected based on the orchestration goal. Alternatively, the segment of company accounts may be manually selected by the user or may include all company accounts associated with the user account.

Each orchestration goal may represent a different stage in the lifecycle of a sales opportunity. In this case, each orchestration goal may be defined by one or more entry criteria that determine whether a company account should be included in the orchestration, and one or more exit criteria that determine whether the company account has achieved that orchestration. It should be understood that the entry criteria represent the criteria by which company accounts are considered eligible to be acted upon by an orchestration, and the exit criteria represent the criteria by which success of an orchestration is measured. The entry and exit criteria may comprise thresholds, timeframes, and/or the like. The particular orchestration goals and/or entry and exit criteria may be configurable by the user via the graphical user interface. Examples of orchestration goals and their respective entry and exit criteria include, without limitation:

Increase Brand Awareness. The entry criteria for this orchestration goal may be satisfied when a company account demonstrates engagement below a first predefined threshold. Engagement may be measured by the predictive intent model, discussed elsewhere herein. The entry criteria may be designed to capture those company accounts that are in the "target" or "awareness" stage of engagement (e.g., in which there has been no first-party engagement, such as visiting a website or opening an email message). The exit criteria for this orchestration goal may be satisfied when the company account demonstrates engagement above a second predefined threshold (e.g., the number of the customer's first-party engagements surpasses the weekly average for the first month prior to being included in the orchestration).

Drive Web Engagement. The entry criteria for this orchestration goal may be satisfied when a company account has fewer webpage views over a predefined time period, preceding the orchestration, than a first predefined threshold (e.g., fewer than ten webpage views in the last month). The exit criteria for this orchestration goal may be satisfied when the company account has more webpage views over a predefined time period than a second predefined threshold.

Create New Opportunities. The entry criteria for this orchestration goal may be satisfied when a company account is not associated with any open sales opportunity at the time of the orchestration. The exit criteria for this orchestration goal may be satisfied when the company account becomes associated with a new sales opportunity.

Accelerate Existing Opportunities. The entry criteria for this orchestration goal may be satisfied when a company account is associated with an open sales opportunity at the time of the orchestrated strategy. The exit criteria for this orchestration goal may be satisfied when the sales opportunity is closed (e.g., won or lost).

Prepare for Renewal. The entry criteria for this orchestration goal may be satisfied when a company account is a current customer and is associated with an upcoming renewal. The exit criteria for this orchestration goal may be satisfied when a company account demonstrates engagement in a predefined time period (e.g., ninety days) preceding renewal that is at least a predefined threshold percentage of the average engagement associated with new sales opportunities.

In subprocess 320, the available orchestration tactics may be configured. Each orchestration goal may be associated with an allowable set of orchestration tactic(s). As used herein, the term "tactic" refers to any action that may be recommended for an orchestration and/or a set of one or more parameters for such an action. Examples of tactics include, without limitation, purchasing new contacts, adding a company account to a display campaign, adding an existing contact to a campaign in a particular channel, and/or the like. Channels may include any category of engagement with a contact, including, without limitation, online display, webinars, email communications (e.g., to nurture the contact), direct mail communications, telephone communications, field events (e.g., tradeshows, conventions, etc.), and/or the like. In an embodiment, the user may configure one or more of the tactics via the graphical user interface, including, for example, specifying which tactics are available for a given orchestration goal, identifying which marketing campaign to use with a given tactic (e.g., which marketing campaign to use for a specific channel), specifying limits on the number or type of contacts that may be purchased and/or added to a marketing campaign, and/or the like.

In subprocess 330, one or more other settings, if any, may be received. In an embodiment, the user may specify whether or not the orchestration may be executed automatically. If this setting is activated, the recommended orchestration may be automatically executed once it has been generated by the recommendation engine. Otherwise, if this setting is deactivated (e.g., by default), the recommended orchestration may require approval before being executed.

In subprocess 340, the recommendation engine may be applied to the current data pipeline to generate a recommended orchestration. The recommended orchestration may comprise one or a plurality of recommended actions, as described in more detail elsewhere herein.

In subprocess 350, a determination is made as to whether or not the recommended orchestration, generated in subprocess 340, should be automatically executed. For example, if the setting for automatic execution is not activated, then subprocess 350 may determine that the recommended orchestration should not be automatically executed (i.e., "No" in subprocess 350). When determining that the recommended orchestration should not be automatically executed (i.e., "No" in subprocess 350), process 300 proceeds to subprocess 360. Conversely, if the setting for automatic execution is activated, then subprocess 350 may determine that the recommended orchestration should be automatically executed (i.e., "Yes" in subprocess 350). When determining that the recommended orchestration should be automatically executed (i.e., "Yes" in subprocess 350), process 300 proceeds to subprocess 370, without executing subprocess 360.

In subprocess 360, one or more modifications and/or one or more approvals may be received. For example, the user may review the recommended orchestration, generated in subprocess 340, within the graphical user interface (e.g., via navigation through the dashboard of the user account). The recommended orchestration may comprise a plurality of recommended actions (e.g., purchase a specific contact, add a specific contact to a marketing campaign, etc.), and each of the plurality of recommended actions may be represented as a selectable and/or editable entry in a list that collectively represents the entire recommended orchestration. The user may modify the recommend orchestration by deleting recommended actions, adding new actions, editing actions, and/or the like. Once the user is satisfied with the orchestration, the user may approve the orchestration and/or request approval for the orchestration from another user. Alternatively, the user may dismiss the orchestration altogether, in which case process 300 may end. Thus, subprocess 360 acts as a quality-control safeguard to prevent the execution of problematic orchestrations.

In addition, subprocess 360 may be used as feedback for the recommendation engine. For example, modifications to orchestrations over one or more iterations of subprocess 360 may be used to evaluate, modify, retrain, and/or otherwise improve one or more models or other components of the recommendation engine.

In subprocess 370, the orchestration, recommended in subprocess 340 and optionally modified in subprocess 360, may be executed. In particular, each action in the orchestration may be executed. For example, this execution may comprise adding company accounts (e.g., which satisfy the entry criteria for the orchestration goal received in subprocess 310) to one or more marketing campaigns in one or more channels. It should be understood that adding a company account to a marketing campaign may comprise adding one or more specific contacts associated with the company account to the marketing campaign. Each specific contact may comprise contact information, such as a name, company name, mailing address, email address, telephone number, and/or the like. Execution of an orchestration may also comprise initiating the marketing campaigns to which the company accounts were added. In this case, the marketing campaign may be provided to the contacts, specified in the individual actions in the orchestration, by providing the marketing material (e.g., banner advertisements or other images, email messages, telephone calls, letters, brochures, etc.) that is appropriate for the given channel (e.g., email messages for email communications, voice message for telephone communications, print advertisements for direct mail, etc.) to the contact information that is appropriate for the given channel (e.g., email address for email communications, telephone number for telephone communications, mailing address for direct mail, etc.).

In subprocess 380, metrics for the orchestration, executed in subprocess 370, may be collected. These metrics may measure the engagement of the company accounts with the marketing campaigns during the executed orchestration. For example, the metrics may measure how many company accounts satisfied the exit criteria for the orchestration goal that was received in subprocess 310. These metrics may be used to evaluate the success of the orchestration.

In addition, the metrics, collected in subprocess 380, may be used to construct a model that recommends specific marketing campaigns for a given orchestration goal. In particular, an orchestration links a specific orchestration goal to one or more specific campaigns. The metrics provide a measure of how successful each of these specific marketing campaigns was in achieving the orchestration goal. Thus, this information may be used to build a training dataset that can be used to train a machine-learning model, or otherwise construct a model, that receives an orchestration goal as an input, and outputs a recommended marketing campaign.

Similarly, the metrics, collected in subprocess 380, may be used to construct a model that recommends specific marketing campaigns for a given segment of company accounts. In particular, an orchestration links specific company accounts to one or more specific campaigns. The metrics provide a measure of how successful each of these specific marketing campaigns was in engaging the segment of company accounts. Thus, this information may be used to build a training dataset that can be used to train a machine-learning model, or otherwise construct a model, that receives a segment of company accounts as an input, and outputs a recommended marketing campaign.

2.3. Recommendation Engine

Figure 4:
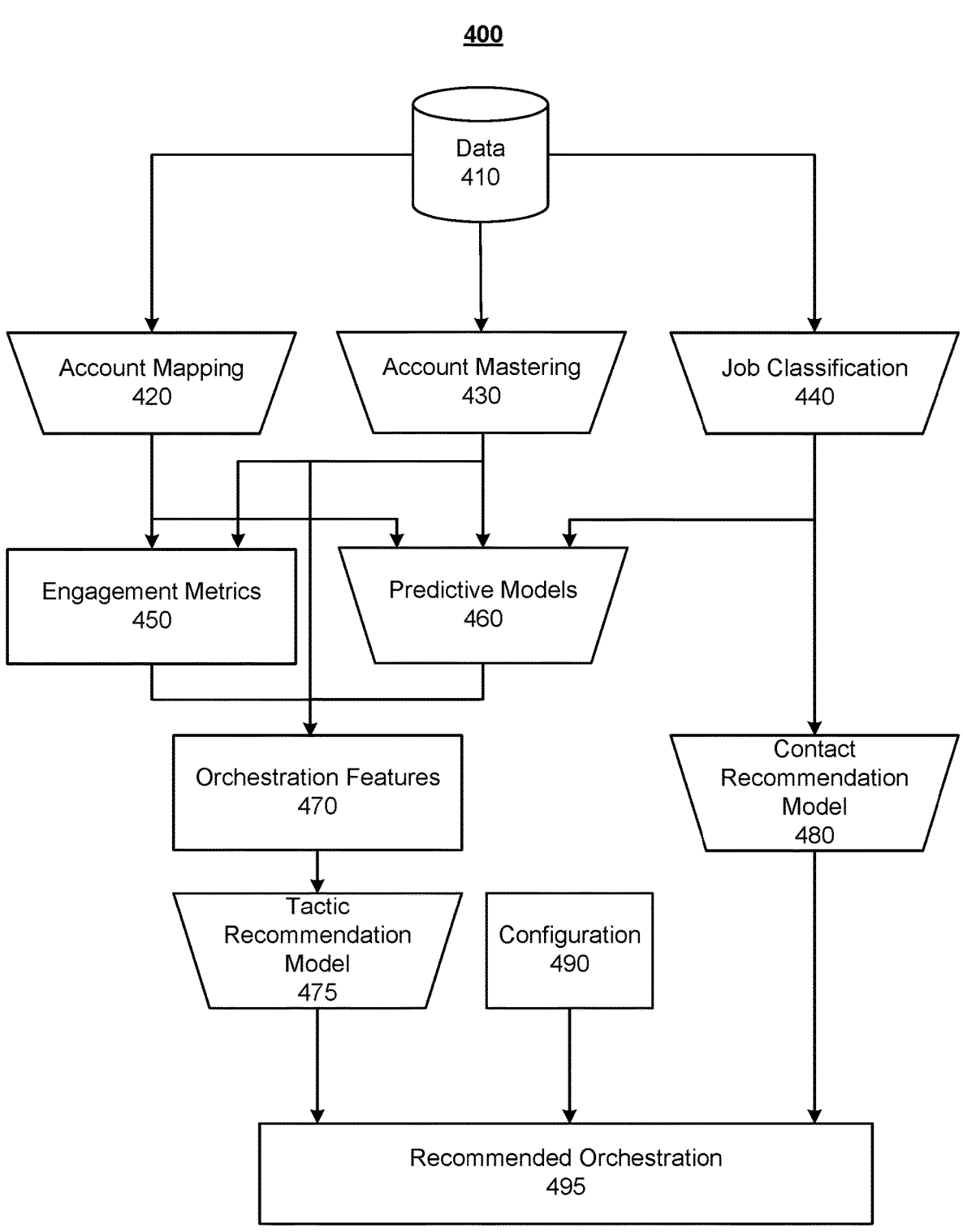
FIG. 4 illustrates an example of an AI-based orchestration recommendation engine, according to an embodiment.

FIG. 4 illustrates an example of an AI-based orchestration recommendation engine 400, according to an embodiment. Recommendation engine 400 represents an example of the recommendation engine that may be applied in subprocess 340 to generate a recommended orchestration. In an embodiment, recommendation engine 400 relies on a pipeline that processes data 410 for a given user account. While recommendation engine 400 will be described with respect to a single user account on platform 110, it should be understood that recommendation engine 400 may be used for each of a plurality of user accounts on platform 110. In this case, each user account may be associated with different data 410, models, and/or other settings, and platform 110 may manage the associations of each user account with its corresponding settings.

Data 410 may comprise data that have been aggregated or unified from a plurality of data sources. For example, these data sources may comprise a CRM system that is associated with the user account, a MAP that is associated with the user account, a website that is associated with the user account (e.g., via first-party trackers embedded in the webpages of the website), vendor data (e.g., IP-based keyword research data) for a business-to-business (B2B) network, and/or the like. These data sources may be external systems 140. In this case, the data may be "pushed" by one or more external systems 140 to platform 110 via an API of platform 110 and/or may be "pulled" by platform 110 from one or more external systems 140 via an API of external system(s) 140.

Data 410 may comprise both profile data and behavioral data for companies and/or contacts. Behavioral data may come from the user account's associated CRM system and/or MAP. This behavioral data may comprise activities that represent engagements with a sales or marketing campaign, such as opening an email message, clicking on a link in an email message, registering for an event, attending an event, submitting a form, and/or the like. The behavioral data may also comprise data representing visits to the website associated with a user account, keyword research, and/or the like. This behavioral data may be tracked by IP address, domain name, cookies, email address, and/or the like, such that the behavioral data can be linked to specific companies and/or contacts, as described elsewhere herein.

Data 410 may supply a plurality of processes, including a process 420 that maps activities to company accounts or contacts, a process 430 that performs mastering of firmographic data for company accounts or contacts, and/or a process 440 that performs job classification for contacts. Processes 420, 430, and 440 may each utilize different portions of data 410, the same portions of data 410, or overlapping portions of data 410.

Process 420 refers to the process of deanonymizing Internet activities by associating online activities with company accounts based on features, such as IP addresses, domains, cookies, and/or the like. In particular, data 410 may comprise representations of online activities (e.g., visiting a webpage, filling out a form, downloading a file, etc.) that are each associated with one or more features, and process 420 may associate each online activity with a company account based on probable associations of the associated features with the company accounts. These online activities may be received in data 410 from a CRM system, MAP system, website, and/or the like that are associated with the user account, from a third-party system, and/or from a proprietary system (e.g., integrated in platform 110). An example of process 420 is described in U.S. Pat. No. 10,536,427, issued on Jan. 14, 2020, which is hereby incorporated herein by reference as if set forth in full. By virtue of process 420, otherwise-anonymous online activity is associated with specific ones of the company accounts managed by the user account and/or contacts associated with a company account. It should be understood that these company-specific online activities represent online behaviors by one or more agents (e.g., employees) of a company that is represented by a company account.

Process 430 refers to the process of mastering firmographic data associated with company accounts. In particular, data 410 may comprise firmographic records, and process 430 may clean, normalize, enrich, and/or conflate the firmographic records. The firmographic records that are input to process 430 may be received from a plurality of different sources and represent a very noisy dataset. Process 430 strips away the noise to produce a cleaned and normalized (i.e., mastered), and potentially enriched, dataset. The resulting mastered firmographic records may then be associated with corresponding company accounts and/or contacts, such that associated firmographic data can be easily retrieved for each company account and/or contact. An example of process 430 is described in U.S. Patent Pub. No. 2021/0406285, published on Dec. 30, 2021, which is hereby incorporated herein by reference as if set forth in full. By virtue of process 430, each of one or more of the company accounts, managed by the user account, is associated with firmographic data, representing company-specific information for the company account.

Process 440 refers to the process of classifying job titles into normalized job descriptors (e.g., comprising job levels and/or job functions). In particular, data 410 may comprise contact records, representing contacts and comprising the job title and/or other job description (e.g., free-form text or narrative) of each contact (e.g., along with contact information). Process 440 may be implemented as a classification model that accepts a job title or other job description as input (e.g., as a string of words relating to a contact's job), and outputs a job descriptor (e.g., level and/or function) associated with the job description that was input. The classification model may comprise a lookup table, machine-learning model, or the like. An example of process 440 is described in U.S. Patent Pub. No. 2021/0406933, published on Dec. 30, 2021, which is hereby incorporated herein by reference as if set forth in full. By virtue of process 440, each of one or more contacts, associated with company accounts managed by the user account, is associated with a normalized job descriptor that enables automated apples-to-apples comparisons of job descriptors across two or more contacts (e.g., by one or more predictive models 460), and enables the inference of additional insights. In one particular example, the job descriptor comprises one of approximately seven possible job levels and one of approximately twenty-five possible job functions.

As illustrated in FIG. 4, data derived from one or more of processes 420, 430, and 440 may be input into one or more downstream functions that can be used to recommend an orchestration. For example, the company-specific activity data, derived from process 420, and the company-specific firmographic data, derived from process 430, may be used to compute engagement metrics 450. In addition, the company-specific online activity data derived from process 420, the company-specific firmographic data derived from process 430, and/or the contact-specific job descriptors derived from process 440 may be used as inputs to one or more predictive models 460.

Engagement metrics 450 may be computed from the company-specific activity data (e.g., representing online activities) derived from process 420 and/or the company-specific firmographic data derived from process 430. Engagement metrics 450 may comprise indicators of behavioral engagement, including, without limitation, whether or not there has been keyword research performed by each company account (e.g., at the contact level and/or company level) and/or the quantity of keyword research (e.g., number of keyword searches) performed by each company account (e.g., at the contact level and/or company level), whether or not there has been a visit to the website associated with the user account by each company account (e.g., at the contact level and/or company level) and/or the quantity of visits to the web site (e.g., number of visits to each of one or more webpages) by each company account (e.g., at the contact level and/or company level), and/or the like. Each type of behavioral engagement may be categorized according to the level of engagement (e.g., low, medium, and high). For example, email clicks and webpage views may categorized as "low" engagement, registering for events, downloading electronic documents (e.g., whitepapers), and submitting forms may be categorized as "medium" engagement, and attendance at events may be categorized as "high" engagement. Engagement metrics 450 may be calculated using weights that give greater weigh to behavioral engagements that are categorized as a higher level of engagement than to behavioral engagements that are categorized as a lower level of engagement. Thus, for instance, a single attendance at an event (e.g., webinar) may increase an engagement metric 450 more than many visits to a webpage. At least a subset of the engagement metrics 450 may be incorporated into orchestration features 470.

One or more predictive models 460 may convert one or more inputs, including the company-specific activity data derived from process 420, the company-specific firmographic data derived from process 430, and/or the job descriptors derived from process 440, into outputs that are then incorporated into orchestration features 470. A couple different predictive models 460 will be described herein. It should be understood that predictive models 460 may consist of a single one of the described models or may comprise all of the described models or any subset of the described models, along with zero, one, or a plurality of other models that are not specifically described herein, to generate outputs that are incorporated into orchestration features 370.

In an embodiment, predictive model(s) 460 comprise a profile model that generates a profile score for one or more contacts from contact data (e.g., derived from data 410), including the job descriptors derived in process 440, and/or mastered firmographic data derived by process 430. It should be understood that a contact is an individual and contactable person associated with a company account, and that a given company account may be associated with one or a plurality of contacts. The profile model may be a machine-learning models that uses, for example, a random forest algorithm or gradient-boosting algorithm (e.g., XGBoost). The profile model may be trained on, for example, a training dataset that associates features in the contact data (e.g., job descriptors, such as job level and job function), with sales opportunities that were opened (i.e., contact engaged with sales team for a product), won (i.e., contact purchased the product from the sales team, and thereby became a current customer), or lost (i.e., contact decided not to purchase the product from the sales team). The profile score for a contact indicates the contact's relevance to a sales opportunity (e.g., the likelihood that engaging the contact will "win" the sales opportunity, i.e., produce a sale). An aggregate profile score may be determined for a company account based on the profile scores for the contacts associated with the company account. Examples of the profile model and profile score are described in U.S. Patent Pub. No. 2021/0406933, published on Dec. 30, 2021, which was previously incorporated by reference. In a particular implementation, the profile model produces a profile score between 0 and 100, with higher profile scores representing higher relevance, and lower profile scores representing lower relevance. The scores may be binned into a plurality of distinct categories that represent levels of relevance, such as "strong," "moderate," and "weak." The one of these distinct categories into which a contact or company account is categorized may be the value that is incorporated into orchestration features 470 for a company account. Alternatively or additionally, profile scores may be directly incorporated into orchestration features 470 for each company account.

In an embodiment, predictive model(s) 460 comprise an intent model that generates a company-level and/or contact-level intent score from the company-specific activity data. The intent model may be a statistical model, comprising or based on a naïve Bayes algorithm. The intent score represents a company's or contact's intent or likelihood to engage in a sales opportunity (e.g., the sale of a product offered by the entity represented by the user account). Examples of the intent model and intent score are described in U.S. Pat. No. 9,202,227, issued on Dec. 1, 2015, which is hereby incorporated herein by reference as if set forth in full, and U.S. Patent Pub. No. 2021/0406933, published on Dec. 30, 2021, which was previously incorporated by reference. In a particular implementation, the intent model produces an intent score between 0 and 100, with higher intent scores representing greater buying intent, and lower intent scores representing lower buying intent. In essence, the intent model assigns behavioral scores to company accounts and/or specific contacts. The scores may be binned into a plurality of distinct categories that represent levels of engagement or buying stages. For example, the plurality of categories may comprise: "target," indicating that company account is not aware of a product; "awareness," indicating that a company account is aware of a product; "consideration," representing that a company account is actively researching products; "decision," indicating that a company account has decided to purchase a product; and "purchase," indicating that a company account has purchased a product. The one of these distinct categories into which a company account or contact is categorized may be the value that is incorporated into the set of orchestration features 470 for that company account or contact. Alternatively or additionally, the intent score for each company account or contact may be directly incorporated into the set of orchestration features 470 for that company account or contact.

Engagement metrics 450, the output of predictive model(s) 460, and/or firmographic data derived from process 430 may be aggregated into orchestration features 470. Orchestration features 470 represent key profile and behavioral signals to be used by tactic recommendation model 475 to produce a set of one or more recommended tactics. For example, orchestration features 470 may comprise, for each company account, firmographic data (e.g., industry and company size), engagement metrics 450, the outputs of predictive model(s) 460, and/or the like.

Engagement metrics 450 may comprise an indication of whether or not the company account has engaged in keyword research, an indication of whether or not the company account has engaged in website visits, an indication of the level of engagement (e.g., "low," "medium," or "high") of each contact associated with the company account (e.g., based on a quantification of activities associated with that contact), and/or the like. Engagement metrics 450 for each company account, as incorporated into orchestration features 470, can be used to determine whether a company account is ready for a given tactic.

The output of predictive model(s) 460 may comprise a profile score or category (e.g., "strong," "moderate," or "weak") of the profile score for the company account (e.g., based on the profile scores for contacts associated with the company account) and/or contacts associated with the company account, the intent score or category (e.g., "target," "awareness," "consideration," "decision," or "purchase") of the intent score for the company account and/or contacts associated with the company account, and/or the like. As discussed above, the profile score represents a fit to a sales opportunity (e.g., sale of a product), and the intent score represents the current stage in a buying process. Thus, the outputs of predictive model(s) 460, as incorporated into orchestration features 470, essentially define a current account state of each company account.

Tactic recommendation model 475 receives orchestration features 470 as input, and outputs a recommended set of one or a plurality of tactics to be incorporated into an orchestration. In an embodiment, tactic recommendation model 475 comprises a plurality of tactic-specific models that are each associated with a different available tactic and output a recommendation as to whether or not to use that respective tactic for a given company account and/or contact based on orchestration features 470 for that company account and/or contact. This modular approach to tactic recommendation (i.e., with a separate model for each tactic) enables the model for each tactic to be updated and improved separately and independently from other tactic-specific models, and also enables models for new tactics to be easily incorporated into tactic recommendation model 475 (e.g., as a plug-and-play module).

Each modular tactic-specific model in tactic recommendation model 475 may utilize the same type of model or a different type of model than another tactic-specific model. In an embodiment, each tactic-specific model comprises a machine-learning algorithm, such as a random forest algorithm or gradient-boosting algorithm (e.g., XGBoost). A machine-learning approach excels at finding complex correlations among input signals (e.g., orchestration features 470) and using them to optimize performance. Each tactic-specific model may accept all or a subset of orchestration features 470, associated with a particular company account or contact, as input, and output a recommendation of whether or not to use the respective tactic associated with that tactic-specific model. The output may be a binary value, such as "0" or "false" if the tactic is not recommended, and "1" or "true" if the tactic is recommended.

Each tactic-specific model in tactic recommendation model 475 may be trained using a training dataset comprising labeled feature vectors. In particular, each feature vector may comprise a set of values for orchestration features 470 in historical data, and be labeled with the value of the ground-truth output for that set of values. In an embodiment, the ground-truth output may be whether the tactic, associated with the tactic-specific model, resulted in an engagement within a defined time period (e.g., two weeks) following execution of the tactic, within the historical data. For example, for a tactic comprising adding a contact to a marketing campaign on a particular channel (e.g., email messaging), the ground-truth output may be whether or not the contact engaged with that particular channel (e.g., sent a reply email message, clicked on a link in the email message, etc.) within the defined time period. Training datasets may be generated by correlating historical values of orchestration features 470 associated with company accounts with historical campaign engagement data for those company accounts. In particular, labeled feature vectors may be generated by extracting feature vectors from the historical values of orchestration features 470 for company accounts (e.g., at the account level or contact level), and labeling the extracted feature vector with an indication of whether or not there was engagement by the company account (e.g., at the account level or contact level) within the defined time period. The tactic-specific model, trained using the training dataset, may output a binary value (e.g., 0 or 1, true or false, etc.) that indicates whether or not a future target (e.g., company account or contact) is expected to engage with a marketing campaign based on the values of orchestration features 470 associated with that recipient. In other words, each tactic-specific model may comprise a machine-learning model that determines whether a given tactic is appropriate for an account based on the current account state (e.g., profile and behavioral data).

Tactic recommendation model 475, comprising a tactic-specific model for each tactic, may be thought of as optimizing for overall campaign engagement (e.g., in a plurality of channels). In particular, for each available tactic, tactic recommendation model 475 may apply the associated tactic-specific model to all or a subset of orchestration features 470 for each target to predict whether or not that tactic will result in an engagement by the target. Tactic recommendation model 475 may use these predictions (e.g., by themselves or in a further model) to provide a recommendation for a coordinated marketing campaign comprising one or a plurality of tactics.

In an embodiment, the recommended tactics, output by tactic recommendation model 475, are attached to or instantiated with specific contacts that are recommended by a contact recommendation model 480. In other words, the output of tactic recommendation model 475 and the output of contact recommendation model 480 may be combined, according to a configuration 490, to produce a recommended orchestration 495 comprising one or a plurality of recommended actions representing a coordinated marketing strategy encompassing one or more marketing campaigns across one or more channels. It should be understood that recommended orchestration 495 corresponds to the recommended orchestration output by subprocess 340 in process 300.

Contact recommendation model 480 may utilize a plurality of different models, including the profile model and intent model, described with respect to predictive models 460, to recommend one or more specific contacts for each company account. For example, the profile model may be used to generate a profile score, for each contact associated with a given company account, that represents how relevant that contact is to a sales opportunity, based on contact data derived from data 410. The contact data that are utilized by the profile model may comprise a job descriptor (e.g., job level and/or function), generated by process 440, for each contact. The intent model may be used to generate an intent score, for each contact associated with a given company account, that represents that contact's intent to engage in a sales opportunity, based on contact-specific activity data derived from process 420. Contact recommendation model 480 may also comprise a people recommendation model that recommends prospective contacts, from a master database of people (e.g., compiled from third-party data sources), that may be relevant to a user account but unknown to the user. Thus, the output of contact recommendation model 480 may comprise current contacts for one or more company accounts and prospective contacts that are not associated with an existing company account. An example of contact recommendation model 480, including the various utilized models, is described in U.S. Patent Pub. No. 2021/0406933, published on Dec. 30, 2021, which was previously incorporated by reference. In essence, contact recommendation model 480 uses predictive modeling to identify relevant existing contacts (i.e., already known to the user) to be added to marketing campaigns in an orchestration, as well as to identify relevant new contacts (i.e., not already known to the user) to be added to marketing campaigns in the orchestration. In an embodiment, these relevant new contacts may be purchased, sourced, or otherwise acquired by the user from the operator of platform 110. It should be understood that relevance in this context refers to a contact's predicted influence on a sales opportunity.

As mentioned above, the tactic recommendations, output by tactic recommendation model 475, may be combined with the specific contact recommendations output by contact recommendation model 480, according to configuration 490, to produce a recommended orchestration 495. For example, if the tactic recommendations include a recommendation to add a company account to a particular marketing campaign, one or more specific contact recommendations, output by contact recommendation model 480 and associated with that company account, may be selected and combined with that tactic recommendation to produce, for each of the one or more selected contacts, a recommended action to add that contact to the particular marketing campaign. As another example, if the tactic recommendations include a recommendation to purchase new contacts, one or more specific contact recommendations, output by contact recommendation model 480 and not associated with any company account, may be selected to produce, for each of the one or more selected contacts, a recommended action to purchase and add that contact to a particular marketing campaign.

Configuration 490 may comprise any one or more settings that govern the generation of recommended orchestration 495. For example, configuration 490 may comprise the orchestration goal (e.g., received in subprocess 310) which defines the entry and exit criteria for an orchestration and thereby determines which company accounts may be included in recommended orchestration 495. Additionally or alternatively, configuration 490 may comprise a particular segment of company accounts to be included in recommended orchestration 495. Configuration 490 may also define the tactics that are allowed to be incorporated into recommended orchestration 495. It should be understood that tactics that are not allowed, as defined by configuration 490, are excluded from recommended orchestration 495. Configuration 490 may also define the marketing campaigns to be included in recommended orchestration 495. For example, configuration 490 may specify a particular display campaign (e.g., from among a plurality of available display campaigns). In this case, if the tactic recommendations, output by tactic recommendation model 475, include a recommendation to add a company account to a display campaign, recommendation engine 400 may add a recommendation to orchestration 495 to add a specific contact from the contact recommendations, output by contact recommendation model 480, who is associated with the company account, to the display campaign specified in configuration 490.

In an embodiment, recommended orchestration 495 comprises specific actions (e.g., output by tactic recommendation model 475) that are related to specific contacts (e.g., output by contact recommendation model 480) and/or specific marketing campaigns (e.g., specified in configuration 490). Thus, recommended orchestration 495 represents a specific, coordinated strategy, across one or a plurality of marketing campaigns in one or a plurality of channels, that can be executed (e.g., in subprocess 370) to facilitate sales opportunities for the entity represented by the user account. In addition, the success of the recommended orchestration can be measured over time (e.g., in subprocess 380) and evaluated to improve recommendation engine 400 (e.g., improve account-level and/or contact-level predictions by the various models described herein) and/or process 300, automate other portions of process 300, build other models, and/or the like.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. A method comprising using at least one hardware processor to:

during a training phase:

train a profile model using machine learning with a first training dataset that associates contact features, comprising one or more job descriptors, with an indication of whether a sales opportunity was opened, won, or lost; and train at least one of a plurality of modular plug-and-play tactic-specific models using machine learning with a second training dataset comprising labeled feature vectors, wherein each of the labeled feature vectors comprises a set of orchestration features labeled with an indication of whether or not an engagement resulted within a defined time period; and during an operation phase:

receive one or more orchestration settings;

automatically apply a recommendation engine to a data pipeline representing a plurality of company accounts by receiving activity data associated with the plurality of company accounts, receiving firmographic data associated with the plurality of company accounts, calculating one or more engagement metrics based on the activity data, wherein the one or more engagement metrics indicate a level of engagement by each of the plurality of company accounts, applying a plurality of predictive models to one or both of the activity data and the firmographic data to generate a predictive output, wherein the plurality of predictive models comprises the profile model and an intent model, wherein the profile model accepts, as input, the contact features for each of one or more contacts within contact data associated with each of one or more of the plurality of company accounts, and outputs a profile score for each of the one or more contacts, wherein the profile score for each of the one or more contacts represents a relevance of that contact to a sales opportunity, and wherein the profile scores that are output by the profile model are incorporated into the predictive output, and wherein the intent model accepts, as input, activity data associated with each of one or more of the plurality of company accounts, and outputs an intent score, wherein the intent score represents a likelihood to engage in a sales opportunity, and wherein the intent scores that are output by the intent model are incorporated into the predictive output, applying a tactic recommendation model to orchestration features, comprising the engagement metrics and the predictive output, to generate one or more recommended tactics, wherein the tactic recommendation model comprises the plurality of modular plug-and-play tactic-specific models, and wherein each of the plurality of modular plug-and-play tactic-specific models is trained to determine whether or not a respective tactic should be used for each of the plurality of company accounts based on the orchestration features associated with that company account, applying a contact recommendation model to contact data to generate one or more recommended contacts, and combining the one or more recommended tactics with the one or more recommended contacts to generate an orchestration comprising one or more recommended actions; and execute the orchestration, wherein executing the orchestration comprises at least one of adding one of the one or more recommended contacts to a marketing campaign, adding one of the plurality of company accounts to a marketing campaign, purchasing a new contact, or initiating a marketing campaign to at least one of the one or more recommended contacts, one or more of the plurality of company accounts, or one or more purchased new contacts.

2. The method of claim 1, wherein the one or more orchestration settings comprise an orchestration goal.

3. The method of claim 2, wherein the orchestration goal defines one or more entry criteria, and wherein the method further comprises using the at least one hardware processor to select the plurality of company accounts as a subset of a plurality of available company accounts based on the one or more entry criteria.

4. The method of claim 2, wherein the orchestration goal defines one or more exit criteria, and wherein the method further comprises using the at least one hardware processor to, after executing the orchestration, measure a success of the orchestration based on company accounts that satisfy the one or more exit criteria.

5. The method of claim 1, wherein the one or more orchestration settings comprise a set of tactics, and wherein the tactic recommendation model is constrained to only incorporate tactics from the set of tactics into the one or more recommended tactics.

6. The method of claim 1, wherein the one or more orchestration settings comprise, for at least one tactic that is available to be recommended by the tactic recommendation model, an identifier of at least one marketing campaign to be associated with the at least one tactic.

7. The method of claim 1, wherein the one or more orchestration settings comprise an indication of whether or not the orchestration is to be executed automatically, wherein the method comprises using the at least one hardware processor to:

when the indication is that the orchestration is to be executed automatically, automatically execute the orchestration without user intervention; and, when the indication is that the orchestration is not to be executed automatically, request user approval of the orchestration, and execute the orchestration only after the user approval has been received.

8. The method of claim 1, wherein the activity data comprise representations of online activities that have been mapped to the plurality of company accounts, and wherein calculating the one or more engagement metrics comprises weighting a first type of online activity higher than a second type of online activity.

9. The method of claim 1, wherein the orchestration features further comprise at least a subset of the firmographic data.

10. The method of claim 1, wherein combining the one or more recommended tactics with the one or more recommended contacts comprises converting a tactic to add a company account to a marketing campaign into an action to add one of the recommended contacts, which is already associated with one of the plurality of company accounts, to a marketing campaign identified in the orchestration settings.

11. The method of claim 1, wherein combining the one or more recommended tactics with the one or more recommended contacts comprises converting a tactic to acquire a new contact into an action to acquire one of the recommended contacts, which is not already associated with one of the plurality of company accounts.

12. The method of claim 1, wherein the contact recommendation model utilizes the profile model to predict a relevance of each contact, which is associated with the plurality of company accounts, to a sales opportunity, and generates the one or more recommended contacts based on the predicted relevance.

13. The method of claim 12, wherein the contact recommendation model further utilizes the profile model to predict a relevance of each of a plurality of contacts, which is not already associated with the plurality of company accounts, to a sales opportunity.

14. The method of claim 1, wherein the profile model comprises a random forest algorithm or a gradient-boosting algorithm.

15. The method of claim 1, wherein the intent model comprises a Bayes algorithm.

16. The method of claim 1, wherein the at least one of the plurality of modular plug-and-play tactic-specific models comprises a random forest algorithm or a gradient-boosting algorithm.

17. A system comprising:

at least one hardware processor; and software that is configured to, when executed by the at least one hardware processor, during a training phase, train a profile model using machine learning with a first training dataset that associates contact features, comprising one or more job descriptors, with an indication of whether a sales opportunity was opened, won, or lost, and train at least one of a plurality of modular plug-and-play tactic-specific models using machine learning with a second training dataset comprising labeled feature vectors, wherein each of the labeled feature vectors comprises a set of orchestration features labeled with an indication of whether or not an engagement resulted within a defined time period, and during an operation phase, receive one or more orchestration settings, automatically apply a recommendation engine to a data pipeline representing a plurality of company accounts by receiving activity data associated with the plurality of company accounts, receiving firmographic data associated with the plurality of company accounts, calculating one or more engagement metrics based on the activity data, wherein the one or more engagement metrics indicate a level of engagement by each of the plurality of company accounts, applying a plurality of predictive models to one or both of the activity data and the firmographic data to generate a predictive output, wherein the plurality of predictive models comprises the profile model and an intent model, wherein the profile model accepts, as input, the contact features for each of one or more contacts within contact data associated with each of one or more of the plurality of company accounts, and outputs a profile score for each of the one or more contacts, wherein the profile score for each of the one or more contacts represents a relevance of that contact to a sales opportunity, and wherein the profile scores that are output by the profile model are incorporated into the predictive output, and wherein the intent model accepts, as input, activity data associated with each of one or more of the plurality of company accounts, and outputs an intent score, wherein the intent score represents a likelihood to engage in a sales opportunity, and wherein the intent scores that are output by the intent model are incorporated into the predictive output, applying a tactic recommendation model to orchestration features, comprising the engagement metrics and the predictive output, to generate one or more recommended tactics, wherein the tactic recommendation model comprises the plurality of modular plug-and-play tactic-specific models, and wherein each of the plurality of modular plug-and-play tactic-specific models is trained to determine whether or not a respective tactic should be used for each of the plurality of company accounts based on the orchestration features associated with that company account, applying a contact recommendation model to contact data to generate one or more recommended contacts, and combining the one or more recommended tactics with the one or more recommended contacts to generate an orchestration comprising one or more recommended actions, and execute the orchestration, wherein executing the orchestration comprises at least one of adding one of the one or more recommended contacts to a marketing campaign, adding one of the plurality of company accounts to a marketing campaign, purchasing a new contact, or initiating a marketing campaign to at least one of the one or more recommended contacts, one or more of the plurality of company accounts, or one or more purchased new contacts.

18. A non-transitory computer-readable medium having instructions stored therein, wherein the instructions, when executed by a processor, cause the processor to:

during a training phase:

train a profile model using machine learning with a first training dataset that associates contact features, comprising one or more job descriptors, with an indication of whether a sales opportunity was opened, won, or lost; and train at least one of a plurality of modular plug-and-play tactic-specific models using machine learning with a second training dataset comprising labeled feature vectors, wherein each of the labeled feature vectors comprises a set of orchestration features labeled with an indication of whether or not an engagement resulted within a defined time period; and during an operation phase:

receive one or more orchestration settings;

automatically apply a recommendation engine to a data pipeline representing a plurality of company accounts by receiving activity data associated with the plurality of company accounts, receiving firmographic data associated with the plurality of company accounts, calculating one or more engagement metrics based on the activity data, wherein the one or more engagement metrics indicate a level of engagement by each of the plurality of company accounts, applying a plurality of predictive models to one or both of the activity data and the firmographic data to generate a predictive output, wherein the plurality of predictive models comprises the profile model and an intent model, wherein the profile model accepts, as input, the contact features for each of one or more contacts within contact data associated with each of one or more of the plurality of company accounts, and outputs a profile score for each of the one or more contacts, wherein the profile score for each of the one or more contacts represents a relevance of that contact to a sales opportunity, and wherein the profile scores that are output by the profile model are incorporated into the predictive output, and wherein the intent model accepts, as input, activity data associated with each of one or more of the plurality of company accounts, and outputs an intent score, wherein the intent score represents a likelihood to engage in a sales opportunity, and wherein the intent scores that are output by the intent model are incorporated into the predictive output, applying a tactic recommendation model to orchestration features, comprising the engagement metrics and the predictive output, to generate one or more recommended tactics, wherein the tactic recommendation model comprises the plurality of modular plug-and-play tactic-specific models, and wherein each of the plurality of modular plug-and-play tactic-specific models is trained to determine whether or not a respective tactic should be used for each of the plurality of company accounts based on the orchestration features associated with that company account, applying a contact recommendation model to contact data to generate one or more recommended contacts, and combining the one or more recommended tactics with the one or more recommended contacts to generate an orchestration comprising one or more recommended actions; and execute the orchestration, wherein executing the orchestration comprises at least one of adding one of the one or more recommended contacts to a marketing campaign, adding one of the plurality of company accounts to a marketing campaign, purchasing a new contact, or initiating a marketing campaign to at least one of the one or more recommended contacts, one or more of the plurality of company accounts, or one or more purchased new contacts.

* * * * *